United States Patent
Bauer et al.

(10) Patent No.: US 7,059,127 B2
(45) Date of Patent: Jun. 13, 2006

(54) HYDRO-PNEUMATIC SPRING SUPPORT ARRANGEMENT

(75) Inventors: Wolfgang Bauer, Bad Dürkheim (DE); Heinz Schwegler, Neulussheim (DE)

(73) Assignee: Deere & Company, Moline, IL (US)

( * ) Notice: Subject to any disclaimer, the term of this patent is extended or adjusted under 35 U.S.C. 154(b) by 4 days.

(21) Appl. No.: 10/899,843

(22) Filed: Jul. 27, 2004

(65) Prior Publication Data

US 2005/0050886 A1    Mar. 10, 2005

(30) Foreign Application Priority Data

Aug. 16, 2003   (DE)   ............................... 103 37 600

(51) Int. Cl.
*F15B 13/04*   (2006.01)
(52) U.S. Cl. .............................. 60/469; 60/416; 91/454
(58) Field of Classification Search ................. 60/413, 60/416, 469; 91/454
See application file for complete search history.

(56) References Cited

U.S. PATENT DOCUMENTS 6,009,708 A * 1/2000 Miki et al. ..................... 60/414
6,145,859 A * 11/2000 Altherr et al. ........ 280/124.159

FOREIGN PATENT DOCUMENTS

| DE | 41 18 822 | 6/1991 |
|---|---|---|
| DE | 41 20 758 | 6/1991 |
| DE | A-41 20 758 | 6/1991 |
| DE | 42 21 126 C 2 | 6/1992 |
| DE | C-42 42 448 | 12/1992 |
| DE | A-43 08 460 | 3/1993 |
| DE | A-197-19 076 | 5/1997 |
| DE | A-197 19 077 | 5/1997 |
| DE | 197 48 224 | 10/1997 |
| EP | 1 188 587 | 3/2001 |

* cited by examiner

*Primary Examiner*—Edward K. Look
*Assistant Examiner*—Michael Leslie

(57) ABSTRACT

A hydro-pneumatic spring support arrangement, particularly for a vehicle axle with at least one hydraulic spring support cylinder arranged between vehicle chassis and vehicle axle, having a cylinder chamber and a rod end chamber each connected with at least one pressure accumulator and can be selectively connected by valve arrangements with a pressure source and a tank. To influence the ratio of the square of the spring rate to the axle loading and to make the spring rate conform to ballasting, vehicle, or operating conditions, the valve arrangement associated with the rod end chamber is provided with at least one first electromagnetic valve which connects the rod end chamber with the pressure source and is provided with a second electromagnetic valve which connects the rod end chamber with the tank. A pressure sensor is provided, particularly a rod end chamber pressure sensor, the signals of which are utilized for the control of the first and the second electromagnetic valves.

17 Claims, 2 Drawing Sheets

HYDRO-PNEUMATIC SPRING SUPPORT ARRANGEMENT

FIELD OF THE INVENTION

The present invention concerns a hydro-pneumatic spring support arrangement with at least one hydraulic spring cylinder, having a cylinder chamber and rod end chamber that are each connected with at least one pressure accumulator and that can be connected selectively by means of valve arrangements with a pressure source and a tank. The spring support arrangement should preferably be applied to spring supported wheel suspensions of vehicles, particularly of agricultural or industrial vehicles. The wheel suspension may be a single wheel suspension or the spring supported suspension of a vehicle axle. The at least one spring support cylinder is arranged between the vehicle chassis and the wheel or the vehicle axle.

BACKGROUND OF THE INVENTION

The design of a hydro-pneumatic spring suspension presents a particular challenge, particularly in agricultural or industrial work machines, such as tractors, because in such applications extreme variations in axle load are possible. The axle load bandwidth usually exceeds the pressure ratio possible with membrane-type pressure accumulators. Therefore, in order to maintain the operating range of the pressure accumulators, the system is preloaded. This preload operates as an additional axle load, whereby the ratio of minimum to maximum axle load can be reduced.

The preload of the system is rarely performed by a mechanical preload, with which a single-acting cylinder can also be applied. Instead a double-acting cylinder is typically applied in which the rod end pressure chamber is preloaded to a certain pressure over a pressure accumulator.

The pressure applied to the side of the rod end chamber may correspond to the maximum system pressure as disclosed in German Patent Application DE-A43 08 460 or the pressure is adjusted by a pressure regulator to a certain pre-selected value as disclosed in German Patent DE-C-42 42 448. As in the case of every hydro-pneumatic system, both systems are provided with a spring rate that varies generally as a function of the square of the axle load. On the other hand, for a constant natural frequency of the chassis, a linear relationship would be ideal.

In order to approach a more linear relationship in practice it has been proposed in German Patent Applications DE-A-197 19 076 and DE-A-197 19 077 that a hydraulically controlled pressure control valve be provided in the rod end chamber supply line, whose control spring force is adjusted on the basis of the pressure in the supply line of the cylinder chamber. Thereby the pressure in the rod end chamber is controlled as a function of the pressure in the cylinder chamber of the hydraulic cylinder, where at low loads the additional load in the rod end chamber is a maximum and is steadily reduced to a minimal value at higher loads. Among other items the operating comfort should thereby be improved.

German Patent Application DE-A-41 20 758 describes a hydro-pneumatic vehicle spring suspension of the aforementioned type, in which a hydraulically actuated control valve is arranged in the supply line to the rod end chamber for wide spreads of axle loading, which is exposed on the one hand to the pressure in the rod end chamber and on the other hand to the pressure in the cylinder chamber, so that the pressure in the rod end chamber is controlled as a function of the pressure in the cylinder chamber. Thereby a higher spring stiffness should be attainable in the area of lower axle loads.

Specific axle loads can be generated by various ballasting conditions on the vehicle. For example, in order to equalize the weight of a heavy plow and to bring an adequate load upon the front axle, ballasting weights can be attached to the front of the tractor. This ballasting can result in the same axle loading on the front axle as a tractor that is equipped neither with a plow nor with front weights. However, with previously known vehicle spring suspensions the spring stiffness cannot react to differing ballasting conditions or operating or driving conditions of the vehicle, that is, the spring stiffness is independent of these conditions and is a function only of the immediate axle load. This can lead to the fact that a heavily ballasted tractor is sprung too softly with regard to the pitching natural frequency, while an un-ballasted tractor is too stiff.

Accordingly, there is a clear need in the art for a hydro-pneumatic spring suspension arrangement of the type noted initially through which the aforementioned problems are overcome. In particular the given invariable square relationship of the spring rate to the axle loading should be countered and the spring rate should be made to conform to ballasting conditions and operating or driving conditions of the vehicle and not depend entirely on the actual axle loading.

SUMMARY OF THE INVENTION

The hydro-pneumatic spring support arrangement, according to the invention, contains at least one hydraulic spring cylinder, particularly a double-acting hydraulic cylinder, whose cylinder chamber and rod end chamber are each connected to a pressure accumulator. The spring support cylinder may be arranged, for example, between the chassis of a vehicle and its wheel or axle. The cylinder chamber and the rod end chamber can each be connected independently of each other by means of valve arrangements with a pressure source and with a tank. This spring support arrangement is characterized by a valve arrangement, associated with the rod end chamber, that is provided with at least a first electrically controlled electromagnetic valve that connects the rod end chamber with the pressure source, and a second electrically controlled electromagnetic valve, that connects the rod end chamber with the tank. Moreover at least one pressure sensor is provided whose signals are utilized for the control of the first and the second electromagnetic valve.

The pressure sensor is preferably a rod end chamber pressure sensor. Alternatively or additionally, the cylinder chamber pressure can also be measured and utilized for the control. For this purpose, for example, a separate cylinder chamber pressure sensor could be provided. But it is also possible that a selector valve be provided that selectively connects the rod end chamber or the cylinder chamber with the pressure sensor.

The adjustment of the pressure in the rod end chamber is performed by two electromagnetic valves that can be controlled by control currents generated by a control unit. The rod end chamber pressure sensor reports the rod end chamber pressure as a signal to the control unit. This compares the rod end chamber pressure with predetermined target pressure values and generates corresponding control signals for the electromagnetic valves. If the pressure in the rod end chamber is lower than a predetermined target pressure the first electromagnetic valve is opened, so that fluid can flow from the pressure source to the rod end chamber and to the associated rod end chamber pressure accumulator and the rod end chamber pressure increases. If the pressure in the rod end chamber is higher than a predetermined target pressure, the second electromagnetic valve is opened so that fluid can drain off from the rod end chamber and the associated rod end chamber pressure accumulator to the tank and the rod end chamber pressure is lowered.

During the adjustment of the control current for the electromagnetic valves further parameters can receive consideration in addition to the signals of the rod end chamber pressure sensor, such as ballasting, operating velocity and operating conditions of the application. Since the spring support arrangement as a rule includes a level control with a position transmitter, it is also possible to consider in the control the strength of the shocks detected by the position transmitter which are transmitted from the ground to the tires.

With this spring support arrangement the preload on the side of the rod end chamber of the axle support arrangement can be varied over wide limits. In particular the rod end chamber pressure and thus the spring characteristics can be adjusted as desired within given physical limits, so that, on the one hand, the fixed square relationship of the spring rate to the axle loading can be countered and a more linear relationship of the spring characteristic can be controlled. On the other hand, the spring support arrangement, according to the invention, can react by means of an appropriate electrical control of the electromagnetic control valves to varying ballasting conditions, velocities and application conditions of the vehicle. Thus the spring characteristics can be made to conform automatically and to an optimum degree and individually to varying operating and driving applications.

Beyond that the spring support arrangement, according to the invention, has the particular advantage that the pressure in the rod end chamber can be adjusted to any desired value continuously or in steps as desired within predetermined limits. As such, malfunctions have only a limited effect in the form of pressure variations on the supply side (changes in pump pressure due to additional participants) as well as on the rod end chamber (due to spring movements), since no pressures are used for the direct control of the electromagnetic valves. Preferably a time variation can be considered in the control, so that rapid pressure variations in the rod end chamber can be filtered out by an electronic control arrangement.

Preferably at least one of the two electromagnetic valves is a tightly-sealed-seat electromagnetic valve. This may be, for example, an electromagnetically actuated on-off valve (selector valve), that opens upon the application of an appropriate electrical signal and otherwise is closed.

According to a preferred embodiment of the invention the first electromagnetic valve contains a check valve function in its closed position (turned off, de-energized position) that prevents an inflow of fluid from the pressure source to the rod end chamber. This tightly-sealed-seat check valve is particularly effective in preventing any leakage from the pressure source to the rod end chamber side of the hydraulic cylinder when the first electromagnetic valve is turned off. Alternatively or additionally, there is an advantage in having the second electromagnetic valve contain a check valve function in its closed position (its turned off, de-energized position), that prevents a drainage flow of fluid from the rod end chamber to the tank. This tightly-sealed-seat check valve is particularly effective in preventing any leakage from the rod end chamber side of the hydraulic cylinder to the tank when the second electromagnetic valve is turned off.

In order to prevent a fluid return flow from the rod end chamber of the hydraulic cylinder to the pressure source, particularly when the first electromagnetic valve is opened, it is appropriate to provide a corresponding check valve that is arranged in a series circuit with the first electromagnetic valve. The check valve may be arranged, for example, between the rod end chamber of the hydraulic cylinder and the first electromagnetic valve.

Particularly when the first and/or the second electromagnetic valve is an on-off valve such as a poppet valve as is offered for sale as model SV08-20 by HydraForce, Lincolnshire, Ill., USA, it is advantageous to limit the fluid flow through the electromagnetic valve in order to prevent a sudden, jerk-like pressure build-up or pressure drop-off in the rod end chamber of the hydraulic cylinder and thereby prevent an unstable operation. For this purpose an appropriate further development of the invention provides for the use of an orifice that is arranged in a series circuit with each of the electromagnetic valves. For example, a first orifice could be provided between the rod end chamber and the first electromagnetic valve and/or a second orifice could be provided between the rod end chamber and the second electromagnetic valve. The orifice can be integrated into the associated valve. The application of orifices makes possible a controlled adjustment of the rod end chamber pressure and may also be advantageous in connection with a load-sensing control.

In the following description an orifice is seen as a flow restriction, that may be configured in various ways, for example, as a local narrowing of the flow area (orifice) or a narrowing extending over a longer flow path (throttle).

According to a further particularly preferred embodiment of the invention a proportionally controlled, tightly-sealed-seat valve (proportional valve), such as model SP08-20 sold by HydraForce, Lincolnshire, Ill., USA, is used as a first electromagnetic valve and/or as a second electromagnetic valve. Fundamentally an orifice restricting the flow can be omitted by the application of proportional valves in place of on-off valves. Nevertheless an orifice in connection with a load-sensing control could also be conceivable.

Preferably the first electromagnetic valve is an electrically controlled directional control valve, particularly a 3/2 way directional control valve, which connects its rod end chamber side connection with its tank side connection when it is not energized (tank position) and connects its pressure source side connection with the rod end pressure chamber connection when it is energized (pressure source position). The directional control valve may be an on-off valve as well as a proportionally controlled valve. If a proportional valve is used an orifice for the limitation of the flow is not required.

For certain applications it may be advantageous to use a proportional pressure control valve or a proportional pressure limiting valve for example, model TS98-31 or TS08-27 sold by HydraForce, Lincolnshire, Ill., USA, as first and/or second electromagnetic valve. For example, for a controlled pressure load reduction a proportional pressure limiting valve (with a predetermined time characteristic) could be used on the load reduction side of the tank as a second electromagnetic valve and on the load side of the pressure source a proportional pressure control valve could be used as a first electromagnetic valve.

In case of a failure of the pressure sensor, the first electromagnetic valve could open completely, so that the maximum pressure of the pressure source reaches the rod end chamber and the associated pressure accumulator. However, for normal spring support operation, the accumulator, in particular, need not be designed for the maximum pressure of the pressure source. In order to be able to use accumulators and other hydraulic components that cannot be loaded as highly, according to a preferred further development of the invention, a pressure limiting valve is provided which connects the rod end chamber with the tank and drains the rod end chamber to the tank at a predetermined pressure. A further advantage of the pressure limiting valve is seen in the fact that upon malfunctions the spring support does not become too stiff, which would affect the operating characteristics negatively.

Most appropriately the pressure source is a hydraulic pump. This may, for example, be a hydraulic pump that is already available to supply hydraulic power to other users of the vehicle. In order to apply the hydraulic pump economically, a pump is frequently used that has a load-sensing function in which the system pressure demanded is utilized for the control of the pump. Thereby the hydraulic pump conveys hydraulic fluid only upon demand and changes otherwise to a low power stand-by operation.

In order to be able to apply a load-sensing pump successfully for the spring support arrangement according to the invention, it is proposed according to a preferred further development of the invention, that the control connection of the load-sensing pump be connected over a control line with the rod end chamber side connection of the first electromagnetic valve. When the pressure existing at this connection is drained off to the tank over an orifice or over an electromagnetic valve operating as a proportional valve (non-energized position of the electromagnetic valve), there is no demand for pressurized fluid and the load-sensing pump goes into its stand-by operating mode. Here a pressure drainage from the rod end chamber of the hydraulic cylinder is prevented by a check valve. If, on the other hand, the connection to the pump is opened by the first electromagnetic valve, then the pressure on the side of the rod end chamber increases. This pressure increase is sensed by the load-sensing pump which adjusts its output pressure in such a way that it always lies, for example, 30 Bar above the pressure on the side of the rod end chamber.

As long as the first electromagnetic valve does not establish any connection to the tank, it is necessary for a proper load-sensing operation that the pressure of the pressure source is not constantly equal to the pressure on the side of the rod end chamber, but is drained off according to the requirements. In order to make a drainage of pressurized fluid possible from the side of the rod end chamber to the tank, it is advantageous to connect the control line with the tank over a third orifice or a throttling restriction.

It is appropriate to include in the load sensing system both the rod end chamber side of the hydraulic cylinder and its cylinder chamber side. Here there is an advantage in providing a shuttle valve, having its first input connection connected to the control line on the side of the rod end chamber, having its second input connection connected with the control line on the side of the cylinder chamber and having its central drainage connection connected with the control connection of the load-sensing pump.

Preferably the valves of the spring support arrangement, according to the invention, are combined in a common control block. A valve arrangement for the level control can also be integrated into the control block, this controls the fluid inflow and drainage from the cylinder chamber side.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
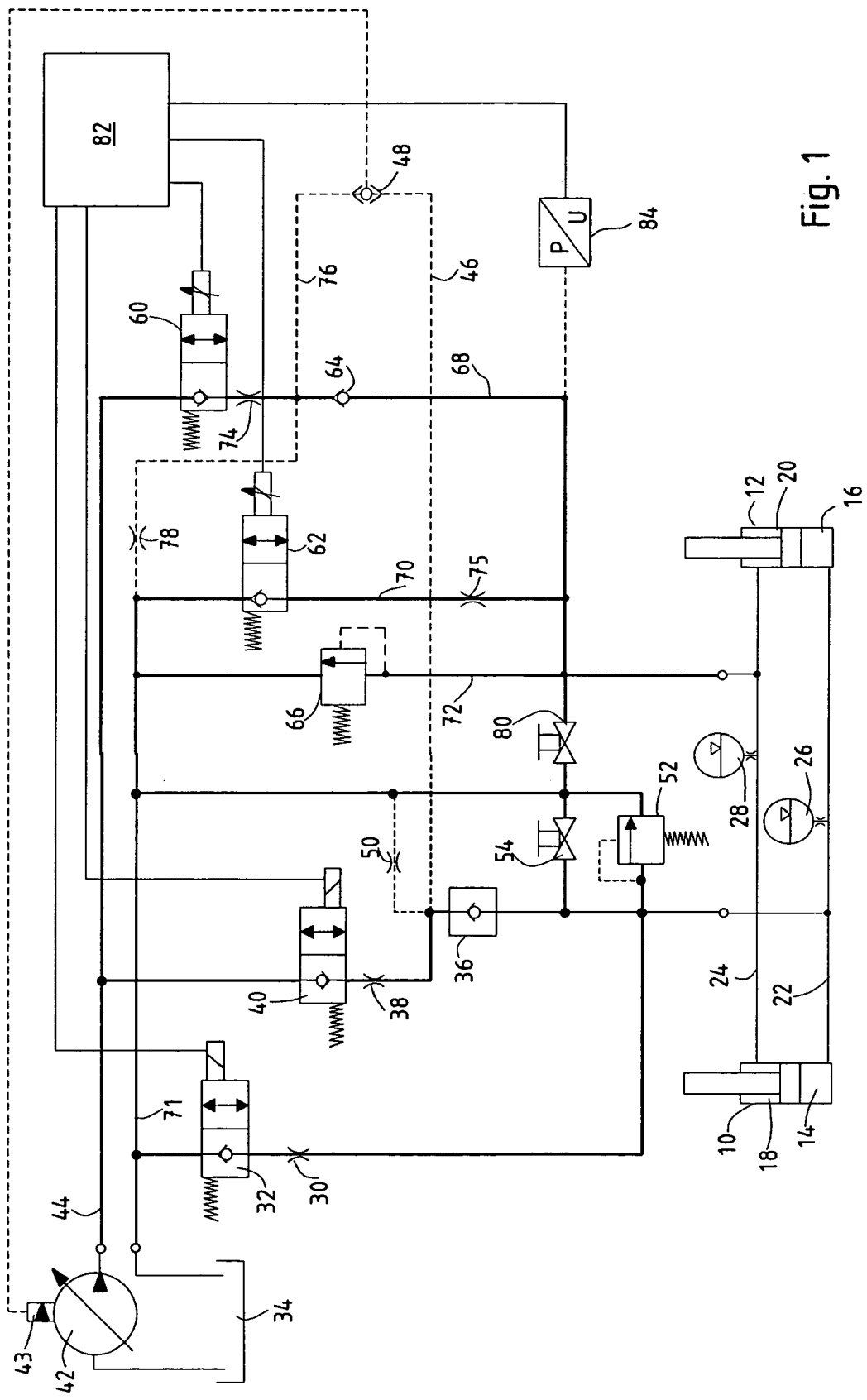
FIG. 1 is a hydraulic control circuit schematic for a hydro-pneumatic spring support arrangement for a vehicle with a first spring support arrangement according to the invention; and, FIG. 2 is a second spring support arrangement according to the invention that can be used in place of the first spring support arrangement in connection with the hydro-pneumatic vehicle spring support arrangement.

The vehicle spring support system shown in FIG. 1 is intended for the spring support of a steerable, pendulously suspended front axle of a tractor (not shown in any further detail). It includes two cylinders 10, 12. The two cylinder chambers 14, 16 of the hydraulic cylinders 10, 12 and the two rod end chambers 18, 20 of the two hydraulic cylinders 10, 12 are each connected over hydraulic lines 22, 24 with each other and with an associated hydraulic accumulator 26, 28.

The hydraulic line 22 on the side of the cylinder chamber (spring support circuit on the side of the cylinder chamber) is connected with a fluid container or a tank 34 over a first orifice 30 and a first tightly-sealed-seat selector valve 32. The first selector valve 32 can be switched by electrical signals between a through flow position and a blocking position, in which it is guaranteed that no fluid can escape in unintended ways from the cylinder side of the spring support circuit to the tank 34. Furthermore, the hydraulic line 22 on the side of the cylinder chamber is connected over a check valve 36, a second orifice 38, and a second tightly-sealed-seat selector valve 40 with a pressure source, that is a controllable load-sensing pump 42. The second selector valve 40 can be switched by electrical signals between a through flow position and a blocking position, in which it is guaranteed that no fluid reaches in unintended ways from the hydraulic pump 42 into the spring support control circuit. The check valve 36 blocks the fluid flow in the opposite direction from that of the second selector valve 40, in order to prevent a leakage when the pressure in the cylinder chamber side of the spring support control circuit is greater than the pressure in the supply line 44.

This valve arrangement is used for the level control. To reduce the position of the level, the first selector valve 32 is energized, its slide valve switches into the position "open" and hydraulic fluid flows out of the hydraulic line 22 under control over the first orifice 30 to the tank 34. In order to control the axle in the upward direction the second selector valve 40 is opened, the fluid flows at first from the supply line 44 over the second orifice 38 into a load-sensing line 46 and reports by means of a shuttle valve 48 the demand for pressurized fluid at the control connection 43 of the pump 42. This controls the pressure upward until the check valve 36 opens and fluid flows into the cylinder chamber side of the hydraulic line 22. On the one hand the volume flow is limited over the second orifice 38, on the other hand a pressure drop is also generated over the second orifice 38, so that the pressure applied to the cylinder chamber side is always reported to the load-sensing system. Thereby the pump 42 does not de-energize completely, but always makes a pressure available that lies, for example, at 30 Bar above the cylinder chamber pressure. Parallel thereto a volume flow flows at all times over a third orifice 50 back to the tank 34 when the second selector valve 40 is opened. This additional cross section made available by the third orifice 50 is needed in order to unload the load-sensing pressure to the tank 34 when the second selector valve 40 is closed.

It must be emphasized that in place of the first selector valve 32 and the first orifice 30 or the second selector valve 40 and the second orifice 38 in each case a proportionally controlled tightly-sealed-seat 2/2 way selector valve can also be used, that can be opened to a purposeful degree under the control of the flow.

The cylinder chamber side of the spring support control circuit, that is, the hydraulic line 22 is secured over a pressure limiting valve 52 to a certain maximum pressure, that is usually determined by the accumulators. In the case of service a drainage valve 54 is used to unload the pressure in the cylinder chamber side.

The rod end chamber pressure is adjusted over a spring support arrangement according to the invention. As shown in FIG. 1 this consists generally of an electrically adjustable tightly-sealed-seat first electromagnetic valve 60, an electrically adjustable second tightly-sealed-seat electromagnetic valve 62, a check valve 64 and a pressure limiting valve 66.

The first electromagnetic valve 60 and the check valve 64 are arranged in a series circuit in a first branch 68 and connect the supply line 44 leading to the pump 42 with the hydraulic line 24 on the side of the rod end chamber. Here the check valve 64 prevents a reverse fluid flow from the rod end chamber to the pump 42. The second electromagnetic valve 62 is arranged in a second branch 70 and connects the rod end chamber side of the hydraulic line 24 with a tank line 71 leading to the tank 34. The pressure limiting valve 66 is arranged in a third branch 72 parallel to the second branch 70 and also connects the rod end side of the hydraulic line 24 with the tank 34. The pressure limiting valve 66 prevents the pressure in the rod end chambers 18, 20 and the rod end pressure accumulator 28 from increasing above a predetermined pressure.

The two electromagnetic valves 60, 62 can be switched between a closed and an open position. A check valve function is integrated into the first electromagnetic valve 60 which prevents a fluid inflow from the pump 42 to the rod end chamber side of the hydraulic line 22 when the valve is in the closed position, so that no leakage or only a negligibly small leakage from the pressure source to the rod end chamber side is permitted. A check valve function is also integrated into the second electromagnetic valve 62 that prevents a fluid drainage flow from the hydraulic line 22 on the side of the rod end chamber to the tank 34 when the valve is in the closed position, so that no leakage or only a negligibly small amount of leakage from the rod end chamber side to the tank is permitted.

In order to limit the flow of fluid when the electromagnetic valves 60, 62 are in their open position, a first orifice 74 is arranged in the first branch 68 and a second orifice 75 is arranged in the second branch 70.

A load sensing line 76 branches off between the first orifice 74 and the check valve 64, it is connected with the shuttle valve 48. The shuttle valve 48 conducts the higher of the pressures in the two load sensing lines 46 and 76 further to the pump 42.

The pressure in the load sensing line 76 can be bled off over a third orifice 78 to the tank 34, without fluid draining off out of the hydraulic line 24 on the side of the rod end chamber. When the first electromagnetic valve 60 is closed, the tank pressure is applied to the load sensing line. If the first electromagnetic valve 60 is opened, then the pressure in the load sensing line 76 increases. This pressure increase is sensed by the load sensing pump, which adjusts its output pressure in such a way that it lies at all times, for example, 30 Bar above the pressure on the side of the rod end chamber. Here the sampling of the load sensing pressure on the rod end chamber side of the first electromagnetic valve 60 provides the assurance that the pump 42 de-energizes only at a pressure of 30 Bar above the rod end chamber pressure. In the case of service a drain valve 80 is used to unload the pressure on the side of the rod end chamber.

The two selector valves 32, 40 and the two electromagnetic valves 60, 62 are controlled by an electric control unit 82. The control unit 82 receives signals from a position transmitter, not shown, that are utilized for the level control by means of the selector valves 32, 40. For the adjustment of the pressure on the side of the rod end chamber the control unit 82 controls the two electromagnetic valves 60, 62. In their non-energized position the electromagnetic valves 60, 62 are closed and are open in their energized position.

The control unit 82 receives signals from a pressure sensor 84 that is connected to the hydraulic line 24 on the side of the rod end chamber and which detects the rod end chamber pressure. If the measured rod end chamber pressure drops below a predetermined value then the first electromagnetic valve 60 is opened, resulting in an increase in the rod end chamber pressure. If the rod end chamber pressure lies above a predetermined value, then the second electromagnetic valve 62 is opened and the rod end chamber pressure can bleed off into the tank 34.

The predetermined value of the rod end chamber pressure can be provided as input by an operator on the basis of the present ballasting of the vehicle. This value is preferably modified by parameters. For this purpose the control unit 82 also evaluates measured values of a vehicle velocity sensor, not shown, and of a towbar force sensor. Thereby the spring stiffness can be adjusted automatically as a function of the vehicle velocity and/or on whether an implement is being towed by the vehicle or is mounted on it, this can be deduced from the signal of the towbar sensor. If this is appropriate, the control unit 82 can also receive and evaluate signals of a rear and/or a front power take off shaft and of other vehicle components. The ballasting of the vehicle can, for example, be provided as input by an operator on the basis of a switch. This is also detected by the control unit and evaluated for the adjustment of the two electromagnetic valves 60, 62. The aforementioned signals and others can be made available to the control unit 82, for example, over a CAN-BUS.

Figure 2:
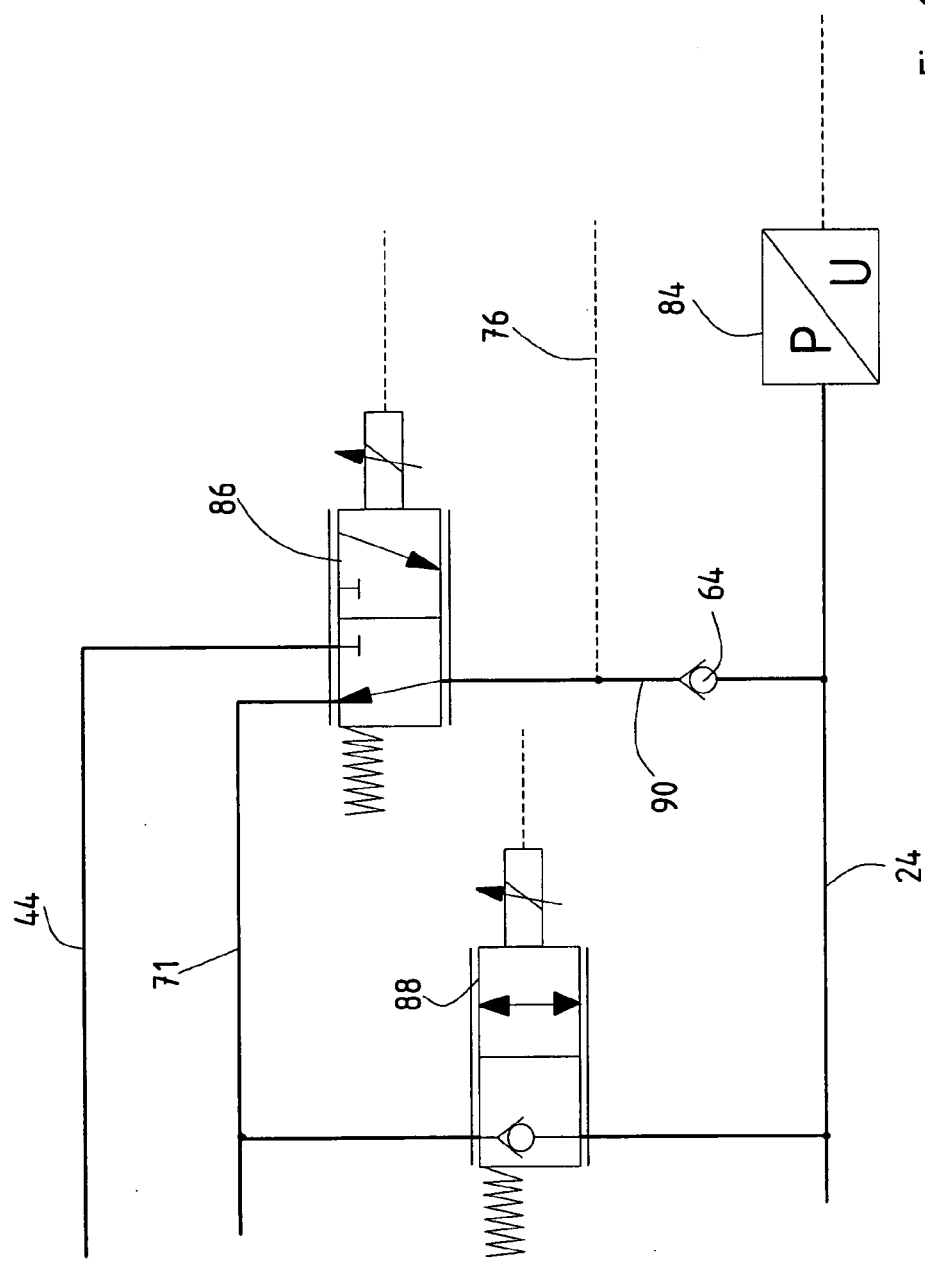

FIG. 2 shows a variation of an embodiment as an alternative to FIG. 1 for the spring support arrangement used for the adjustment of the rod end chamber pressure. In place of the selector valves 60 and 62 as shown in FIG. 1, according to FIG. 2 electrically controlled proportional valves 86, 88 are used.

The first proportional valve 86 is a 3/2 way directional control valve and makes possible a selective connection of the hydraulic line 24 on the side of the rod end chamber with the tank (over the tank line 71) or with the pump 42 (over the supply line 44). Similarly to the case of FIG. 1, the first proportional valve 86 is controlled by a control unit, not shown in FIG. 2.

A check valve 64 is located in the supply line 90 on the side of the rod end chamber of the first proportional valve 86, it prevents a drainage flow from the side of the rod end chamber. In this branch 90 an orifice is not required, since the fluid flow through the first proportional valve 86 can be varied continuously.

A load sensing line 76 branches off between the first proportional valve 86 and the check valve 64, this leads to a shuttle valve 48 as is shown in FIG. 1. The third orifice 78, shown in FIG. 1, is not required in FIG. 2, since the pressure in the load sensing line 76 can bleed off to the tank over the proportional pressure control valve 86.

In case it is necessary, the second proportional valve 88 is used to drain off the pressure in one of the hydraulic lines 24 on the side of the rod end chamber, as has already been explained above on the basis of FIG. 1. By using a proportional valve an orifice, which was shown in FIG. 1, can be omitted in the embodiment according to FIG. 2.

Otherwise the method of operation of a vehicle spring support with a spring support arrangement according to FIG. 2 is similar to the vehicle spring support arrangement shown in FIG. 1.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled. In that way it is possible, for example, to use proportional pressure control valves as well as proportional pressure limiting valves as proportional valves.

The embodiments of the invention in which an exclusive property or privilege is claimed are defined as follows:

1. A hydro-pneumatic spring support arrangement with at least one hydra-pneumatic spring support cylinder, having a cylinder chamber and a rod end chamber each connected with a pressure accumulator and selectively connected by means of valve arrangements with a pressure source and a tank, wherein the valve arrangement associated with the rod end chamber is provided with at least one first electromagnetic valve that connects the rod end chamber with the pressure source, the pressure source containing a load-sensing pump, whose control connection is connected over a control line with the connection on the side of the rod end chamber of the first electromagnetic valve, and a second electromagnetic valve that connects the rod end chamber with the tank, and at least one pressure sensor the signals of which are utilized for the control of the first and the second electromagnetic valves.

2. A hydro-pneumatic spring support arrangement according to claim 1, wherein at least one of the two electromagnetic valves is a tightly-sealed-seat electromagnetic valve.

3. A hydro-pneumatic spring support arrangement according to claim 1, wherein the first electromagnetic valve contains a check valve function in its closed position, that prevents a fluid inflow from the pressure source.

4. A hydro-pneumatic spring support arrangement according to claim 3, wherein the second electromagnetic valve contains a check valve function that prevents a fluid drainage flow from the rod end chamber.

5. A hydro-pneumatic spring support arrangement according to claim 1, wherein the second electromagnetic valve contains a check valve function that prevents a fluid drainage flow from the rod end chamber.

6. A hydro-pneumatic spring support arrangement according to claim 1, wherein at least one check valve is provided, which is arranged in a series circuit with the first electromagnetic valve.

7. A hydro-pneumatic spring support arrangement according to claim 1, wherein at least one first orifice is provided that is arranged in a series circuit with the first electromagnetic valve.

8. A hydro-pneumatic spring support arrangement according to claim 7, wherein at least one second orifice is provided that is arranged in a series circuit with the second electromagnetic valve.

9. A hydro-pneumatic spring support arrangement according to claim 1, wherein at least one second orifice is provided that is arranged in a series circuit with the second electromagnetic valve.

10. A hydro-pneumatic spring support arrangement according to claim 1, wherein the first electromagnetic valve is a proportionally controlled valve.

11. A hydro-pneumatic spring support arrangement according to claim 10, wherein the second electromagnetic valve is a proportionally controlled valve.

12. A hydro-pneumatic spring support arrangement according to claim 1, wherein the second electromagnetic valve is a proportionally controlled valve.

13. A hydro-pneumatic spring support arrangement according to claim 1, wherein a pressure limiting valve is provided which connects the rod end chamber with the tank.

14. A hydro-pneumatic spring support arrangement according to claim 1, wherein the control line is connected with the tank over a third orifice.

15. A hydro-pneumatic spring support arrangement according to claim 14, wherein a shuttle valve is provided having a first inlet connection connected with the control line, having second inlet connection connected with a load-sensing line on the side of the cylinder chamber and having an outlet connection connected with the control connection of the load-sensing pump.

16. A hydro-pneumatic spring support arrangement according to claim 1, wherein a shuttle valve is provided having a first inlet connection connected with the control line, having second inlet connection connected with a load-sensing line on the side of the cylinder chamber and having an outlet connection connected with the control connection of the load-sensing pump.

17. A hydro-pneumatic spring support arrangement with at least one hydro-pneumatic spring support cylinder, having a cylinder chamber and a rod end chamber each connected with a pressure accumulator and selectively connected by means of valve arrangements with a pressure source and a tank, wherein the valve arrangement associated with the rod end chamber is provided with at least one, directional control valve, having its connection on the side of the rod end chamber connected with its connection on the side of the tank when it is in the non-energized position, and having its connection on the side of the pressure source connected with its connection on the side of the rod end chamber when it is in the energized position, and at least one pressure sensor the signals of which are utilized for the control of the directional control valve.

* * * * *